(12) United States Patent  
Kwon

(10) Patent No.: US 8,185,174 B2  
(45) Date of Patent: May 22, 2012

(54) MOBILE TERMINAL

(75) Inventor: Soon-Sung Kwon, Anyang (KR)

(73) Assignee: LG Electronics Inc., Seoul (KR)

( * ) Notice: Subject to any disclaimer, the term of this patent is extended or adjusted under 35 U.S.C. 154(b) by 452 days.

(21) Appl. No.: 12/466,755

(22) Filed: May 15, 2009

(65) Prior Publication Data

US 2010/0062814 A1   Mar. 11, 2010

(30) Foreign Application Priority Data

Sep. 9, 2008   (KR) ........................ 10-2008-0088969

(51) Int. Cl.
*H04M 1/00* (2006.01)
(52) U.S. Cl. .................. 455/575.4; 455/575.1
(58) Field of Classification Search ................ 455/575.4
See application file for complete search history.

(56) References Cited

U.S. PATENT DOCUMENTS

| | | | |
|---|---|---|---|
| 6,535,750 B1 * | 3/2003 | Van Gen | 455/558 |
| 7,079,875 B2 * | 7/2006 | Robertson, Jr. | 455/575.1 |
| 7,680,521 B2 * | 3/2010 | Kim et al. | 455/575.4 |
| 2006/0176012 A1 * | 8/2006 | Lee et al. | 320/107 |
| 2007/0275759 A1 * | 11/2007 | Kemppinen | 455/558 |
| 2008/0070630 A1 * | 3/2008 | Zhang et al. | 455/558 |

* cited by examiner

*Primary Examiner* — Nick Corsaro  
*Assistant Examiner* — Joel Ajayi  
(74) *Attorney, Agent, or Firm* — Birch, Stewart, Kolasch & Birch, LLP

(57) ABSTRACT

A mobile terminal is provided. The mobile terminal includes a first member having an opening extending therethrough, a second member coupled to the first member such that the second member defines, with the opening of the first member, an accommodating portion to receive a battery therein, and a hooking member protrudingly formed at the second member. The hooking member is configured to hook a portion of the battery received in the accommodating portion.

16 Claims, 7 Drawing Sheets

MOBILE TERMINAL

CROSS-REFERENCE TO RELATED APPLICATIONS

This application claims priority to Korean Application No. 10-2008-0088969, filed Sep. 9, 2008, which is herein incorporated by reference in its entirety.

BACKGROUND OF THE INVENTION

1. Field of the Invention

The present invention relates generally to a mobile terminal, and more particularly, to a mobile terminal having an accommodating portion to receive a battery therein and a hooking member to hook a portion of the battery received in the accommodating portion.

2. Description of Related Art

A mobile terminal is a device that can be carried around and provides one or more functions, such as voice and video call communication, inputting and outputting information, storing data, and the like. As the functions of the mobile terminal have become more diversified, the mobile terminal has been implemented in the form of a multimedia player supporting more complicated functions, such as capturing images or video, reproducing music or video files, playing games, receiving broadcast signals, and the like.

In order to implement various functions of such multimedia players or devices, numerous improvements to hardware or software have been developed. For example, a user interface (UI) allowing a user to easily and conveniently search for and select one or more functions is provided. While the development of hardware and software is ongoing, portability of the mobile terminal should not be degraded because consumers still prefer smaller players or devices.

BRIEF SUMMARY OF THE INVENTION

According to principles of this invention, there is provided a mobile terminal configured to allow means for securing a without interfering with other components of the mobile terminal and configured to have a slim structure.

In accordance with one aspect of the present invention, there is provided a mobile terminal including a first member having an opening extending therethrough, a second member coupled to the first member such that the second member defines, with the opening of the first member, an accommodating portion to receive a battery therein, and a hooking member protrudingly formed at the second member. The hooking member is configured to hook a portion of the battery received in the accommodating portion.

In accordance with another aspect of the present invention, there is provided a mobile terminal having a first body and a second body slidably connected to the first body. The first body includes a first sliding plate. The second body includes a rear case and a second sliding plate slidably coupled with the first sliding plate. The second body also includes an accommodating portion configured to receive a battery therein. In addition, the mobile terminal includes a first hooking member protrudingly formed at the second sliding plate, where the first hooking member is configured to hook a portion of the battery received in the accommodating portion.

In accordance with yet another aspect of the present invention, there is provided a mobile terminal including a body having an accommodating portion configured to receive a battery therein, the body including a plate forming a floor of the accommodating portion, and a casing forming a side wall of the accommodating portion. The mobile terminal also includes a first hooking member protrudingly formed at the plate, a second hooking member protrudingly formed at the casing, where the first and second hooking members are configured to hook different portions of the battery. In addition, the mobile terminal includes a card socket formed at the casing for receiving a card therein.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

The mobile terminal according to an exemplary embodiment of the present invention will now be described with reference to the accompanying drawings.

Figure 1:
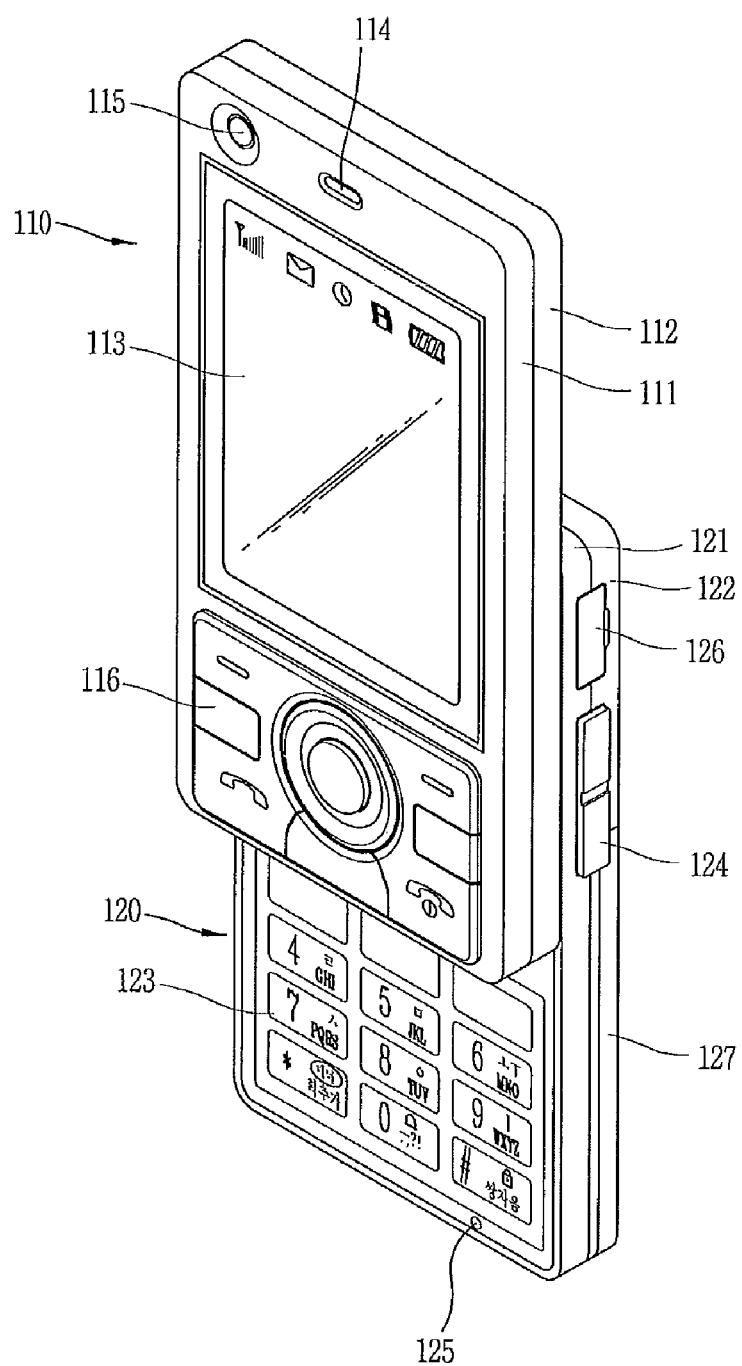
FIG. 1 is a front perspective view of a mobile terminal according to an exemplary embodiment of the present invention.

FIG. 1 is a front perspective view of a mobile terminal according to an exemplary embodiment of the present invention. As shown in FIG. 1, the mobile terminal according to the present invention includes a first body 110 and a second body 120 formed to be slidably moved along at least one direction on the first body 110. The first and second bodes 110 and 120 may be referred to as a terminal body of the mobile terminal. A state in which the first body 110 is disposed to substantially overlap with the second body 120 may be called a closed configuration (see FIG. 3), and, as shown in FIG. 1, a state in which the first body 110 exposes at least a portion of the second body 120 may be called an open configuration. In the closed configuration, the mobile terminal may operate in a standby mode (idle mode), and the standby mode may be released according to a user manipulation. In this exemplary embodiment, the mobile terminal operates mainly in a calling mode or the like in the open configuration, and it can be changed to the standby mode according to a user manipulation or with the lapse of a certain time.

The case, which may also be referred to as a casing, a housing, a cover, or the like, forming the external appearance of the first body 110 includes a front case 111 and a rear case 112. The front case 111 and rear case 112 define first and second surfaces, respectively, of the first body 110. Various electronic components are installed in the space between the front case 111 and the rear case 112. In addition, one or more intermediate cases may be disposed between the front case 111 and the rear case 112 to further define the space between the front case 111 and the rear case 112. The front and rear cases 111 and 112 may be formed by injection-molding a synthetic resin or may be made of a metallic material, e.g., stainless steel (STS), titanium (Ti), or the like.

The front case 111 of the mobile terminal includes a display unit 113, an audio output unit 114, a first image input unit 115, and a first manipulating unit 116 located thereon. The display unit 113 may be a Liquid Crystal Display (LCD) module, an Organic Light Emitting Diode (OLED) module, or other similar displays that visually displays information. The display unit 113 may further include a touch screen to allow inputting of information in a touch manner by the user. The display unit 113 may also generate a variety of haptic feeling, e.g. vibration, when touched by a user. This is implemented by a haptic module which operates in association with the display unit 113. The haptic module may be configured to be associated with other component rather than the display unit 113. The audio output unit 114 may be implemented as a receiver or a speaker. The first image input unit 115 may be implemented in the form of a camera module for capturing an image or video of the user. The first manipulating unit 116 is configured to receive commands for controlling an operation of the mobile terminal by manipulation of the first manipulating unit 116.

Similar to the first body 110, the second body 120 also includes a front case 121 and a rear case 122. The front case 121 and rear case 122 define first and second surfaces, respectively, of the second body 120. A second manipulating unit 123 is disposed on the second body 120, particularly, on a front face of the front case 121. A third manipulation unit 124, a first audio input unit 125, and an interface are disposed on at least one of the front case 121 and the rear case 122. The first audio input unit 125 may be implemented in the form of, for example, a microphone to receive a voice of the user or other sounds.

The first to third manipulating units 116, 123 and 124 may be generally called a manipulation portion, and any means can be employed as the manipulating units so long as they can be operated in a tactile manner. For example, each of the manipulating units may be implemented as a dome switch, a wheel or jog type for rotating a key, a joystick, a touch screen, a touch pad, or any combinations thereof that can receive a command or information according to a pressing or a touch operation by the user. In terms of function, the first manipulating unit 116 may be used to input a command such as start, end, scroll, or the like, and the second manipulating unit 123 may be used to input a number, a character, or a symbol. The third manipulating unit 124 may be operated as a hot key for performing a special function such as activating the first image input unit 115.

The interface 126 may be used as a passage, path, or link allowing the mobile terminal to exchange data with an external device. For example, the interface 126 may be at least one of a connection port to be connected with an earphone, a port for short range communication (e.g., an IrDA port, a BLUETOOTH port, a wireless LAN port, or the like). The interface 126 may be a card socket for receiving/accommodating an external card such as a Subscriber Identification Module (SIM), a User Identity Module (UIM), a memory card for storing information, or the like. The interface may also be used as a power supply port for supplying power to the mobile terminal.

A power supply unit 127 may be mounted at the side of the rear case 122 in order to supply power to the mobile terminal. The power supply unit 127 may be, for example, a rechargeable battery which can be detached to allow for charging of the battery independent of the mobile terminal.

Figure 2:
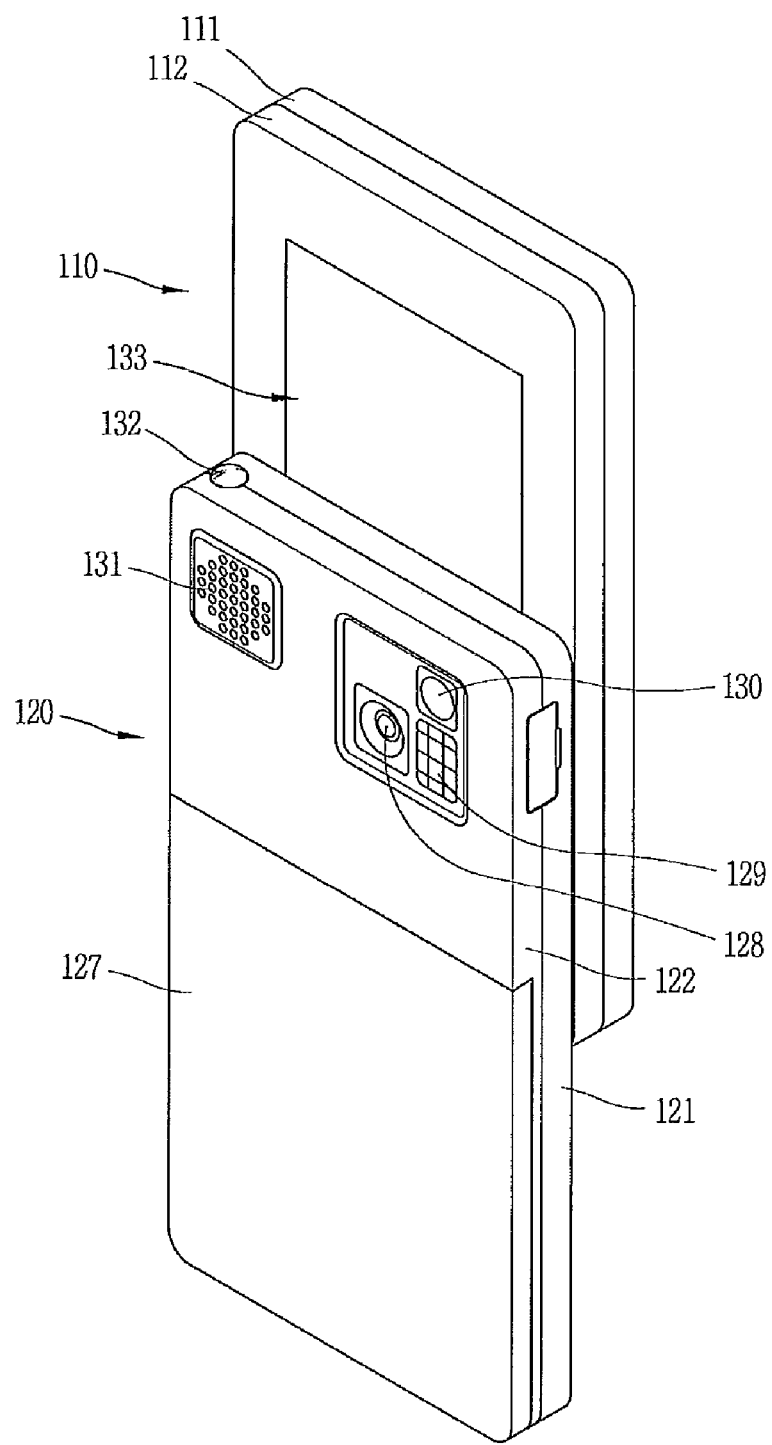
FIG. 2 is a rear perspective view of the mobile terminal of FIG. 1.

FIG. 2 is a rear perspective view of the mobile terminal according to the first exemplary embodiment of the present invention. As shown in FIG. 2, a second image input unit 128 may be mounted on the rear surface of the rear case 122 of the second body 120. In this exemplary embodiment, the second image input unit 128 has an image capture direction which is substantially the opposite to that of the first image input unit 115 (see FIG. 1), and may have a different number of pixels (different resolution) from that of the first image input unit. For example, the first image input unit 115 may operate with a relatively lower resolution to capture the user face and transmit the same to the another party during video call communication or the like in which reverse link bandwidth capabilities may be limited, while the second image input unit 128 may operate with a relatively higher resolution to capture a general subject with a high picture quality. This high quality picture may not be immediately transmitted but may be later used for communicating to others.

A flash 129 and a mirror unit 130 are disposed adjacent to the second image input unit 128. When an image of the subject is captured with the second image input unit 128, the flash 129 illuminates the subject. The mirror unit 130 allows the user to see himself when he wants to capture his own image (self-image capturing) by using the second image input unit 128.

A second audio output unit 31 may be additionally disposed on the rear case 122. The second audio output unit 131 may implement a stereophonic function in conjunction with the first audio output unit (114 in FIG. 1), and may be also used for a call in a speaker phone mode.

A broadcast signal reception antenna 132 may be disposed at one side of the rear case 122, in addition to an antenna used for call communication. The antenna 132 may be installed such that it can be extended from the second body 120.

As shown in FIG. 2, one part of the slide module 133 that slidably connects the first body 110 to the second body 120 is located on the rear case 112 of the first body 110. The other part of the slide module 133 is located on the front case 121 of the second body 120, which is not exposed, as shown in FIG. 2.

While the above description describes various components as being on either the first body 110 or the second body 120, the present invention is not limited to just the configuration shown. For example, one or more of the elements 128 to 132, which are disposed on the rear case 122, such as the second image input unit 128 in the above description, may be mounted on the first body 110, mainly, on the rear case 112. In this case, those elements disposed on the rear case 112 can be protected by the second body 120 in the closed configuration. In addition, even if the second image input unit 128 is not provided, the first image input unit 115 may be configured to rotate (or otherwise be moved) to allow image capturing in various directions.

Figure 3:
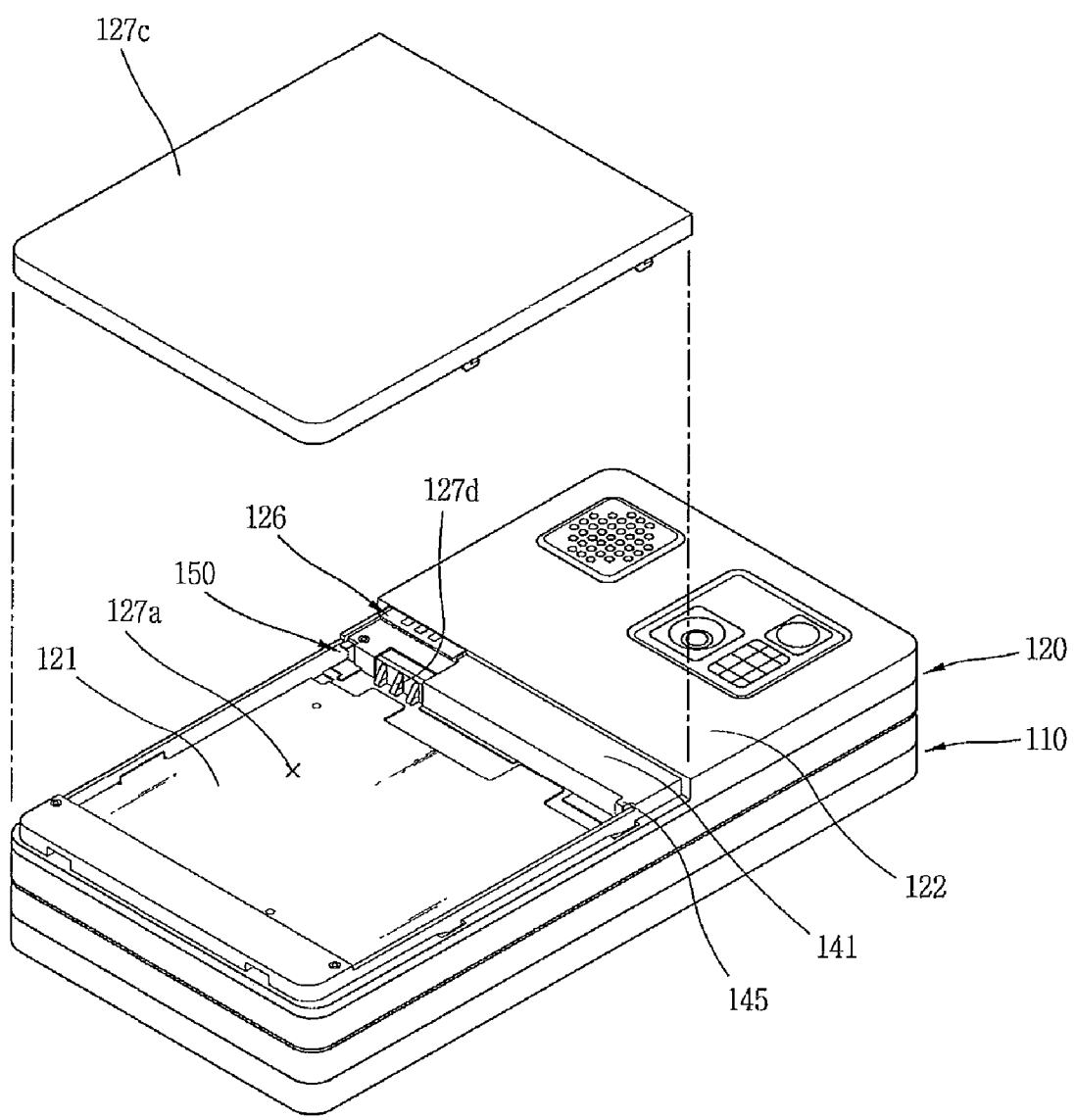
FIG. 3 is a perspective view showing the mobile terminal of FIG. 1 in a direction towards the rear case of the second body in a closed configuration.

FIG. 3 is a perspective view showing the mobile terminal of FIG. 1 in a direction towards the rear case 122 of the second body 120. The rear case 122, which can be also called a first member, has an opening extending therethrough. Through the opening, a portion of a front case 121 coupled with the rear case 122, which can also be called a second member, is exposed through the opening. In this manner, the front case 121 and the opening of the rear case 122 define an accommodating portion 127a to receive a battery 127b (see FIG. 4) of the power supplying unit 127 therein. For example, the exposed portion of the front case 121 can form a floor of the accommodating space 127a and the opening in the rear case 122 defines a sidewall of the accommodating portion 127a.

A terminal 127d is disposed at an edge or corner region of the accommodating portion 127a, and is configured to be electrically connected to a terminal of the battery 127b. Through the terminal 127d, electrical power can be supplied to electronic components housed in a space formed between the front and rear cases 121 and 122 and to other electronic components of the mobile terminal.

A peripheral region 141 is formed to surround at least a portion of the opening portion of the rear case 122, and the peripheral region 141 has a height lower than that of a neighboring portion of the rear case 122. The peripheral region 141 supports a battery cover 127c when the cover 127c is mounted on the rear case 122 to cover the accommodating portion 127a.

In this exemplary embodiment, the interface 126 is a card socket configured to accommodate a card 126c (see FIG. 4) therein. The card socket 126 is disposed between the front and rear cases 121 and 122, and specifically disposed to be adjacent to an inner surface of the rear case 122. An end of the card socket 126 is exposed outward through the peripheral region 141. The card 126c can be withdrawn from the card socket 126 in a direction towards the battery 127b received in the accommodating portion 127a.

A second hooking member 145 may be integrally formed with the rear case 122, and is protruded from a portion of the peripheral region 141. The second hooking member 145 is spaced from the floor of the accommodating portion 127a such that the second hooking member 145 can hook a portion of the battery 127b received in the accommodating portion 127a thereby assuring that the battery 127b is stably kept in a received state in the accommodating portion 127a.

A first hooking member 150 may be formed at a position opposite to a position where the second hooking member 145 is formed. In contrast with the second hooking member 145, the first hooking member 150 is not mounted at the rear case 122 but at the front case 121. The first hooking member 150 is protruded from a main surface of the front case 121 by being bent at least one time, and hooks another portion of the battery 127b.

The first hooking member 150 and the front case 121 may be formed of a material different from that of the rear case 122. For example, the first hooking member 150 and the front case 121 can be formed to have a thickness that is thinner than that of the rear case 122. In addition, the rear case 122 may be molded of a plastic resin, while the first hooking member 150 and the front case 121 may be formed of metal.

Figure 4:
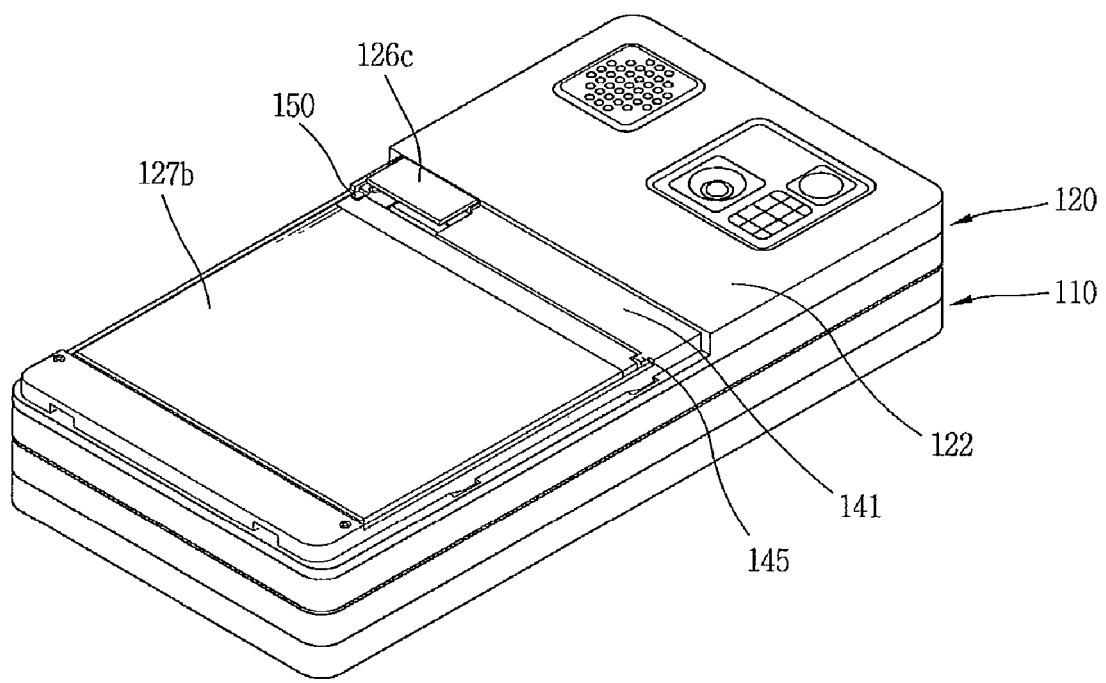
FIG. 4 is a perspective view of the mobile terminal of FIG. 1 showing a state where a battery is received in the accommodating portion and a card is housed in the card socket.

FIG. 4 is a perspective view of the mobile terminal showing a state that the battery 127b is received in the accommodating portion 127a and the card 126c is housed in the card socket 126. As shown in FIG. 4, recessed portions are formed at two corners of the battery 127b, and these recessed portions are hooked by the first and second hooking members 150 and 145, respectively. This configuration reduces the chance of the battery 127b being detached from the accommodating portion 127a, although the cover 127c (see FIG. 3) may be detached from the rear case 122 by a certain level of external force.

An exposed portion of the card 126c received in the card socket 126 is mainly disposed on the peripheral region 141. The end of the exposed portion can be blocked by the first hooking member 150. This assists in keeping the card 126c in a received state in the card socket 126. To block the end of the exposed portion, the first hooking portion 150 extends from the front case 121 towards the rear case 122. Alternatively, the first hooking portion 150 may be configured to not block the card 126c, and the card 126c may be kept in the above state by other means (not shown).

Figure 5:
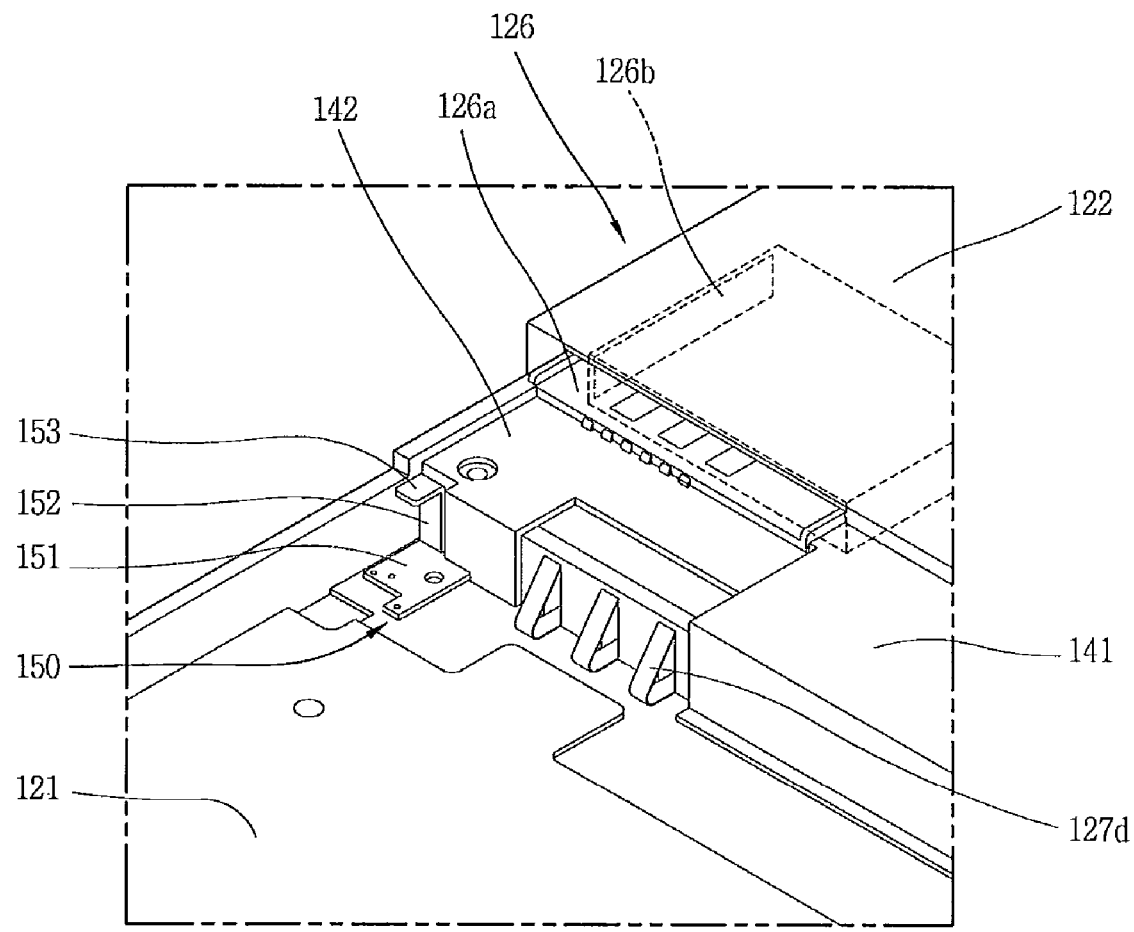
FIG. 5 is an enlarged perspective view showing the first hooking portion and the card socket of the mobile terminal of FIG. 1.

FIG. 5 is an enlarged perspective view showing the first hooking portion 150 and the card socket 126. As shown in FIG. 5, the first hooking member 150 includes a base portion 151 having a substantially planar shape, an extending portion 152, and a protruding portion 153.

The base portion 151 may be coupled with the front case 121 by a spot welding, bonding, or the like, and is supported by the front case 121. To facilitate this structure, the base portion 151 has an area larger than the extending portion 152 and the protruding portion 153.

The extending portion 152 extends from an edge of the base portion 151 by being bent in a direction towards the rear of the mobile terminal. A free end of the extending portion 152 may be bent in a direction towards the battery 127b. In this case, the bent portion forms the protruded portion 153. The protruded portion 153 is used to hook a portion of the battery 127b.

Near the first hooking member 150, the terminal 127d is formed. The card socket 126 is formed to be adjacent the first hooking member 150 and the terminal 127d. The card socket 126 may be a composite type that has two inlets, i.e. first and second inlets 126a and 126b. The first inlet 126a is disposed to face the battery 127b while the second inlet 126b is disposed to face outward. In this manner, two different cards can be used. For example, a SIM or a UIM can be inserted into the card socket 126 through the first inlet 126a while a memory card is inserted in the card socket 126 through the second inlet 126b. To facilitate the insertion or withdrawal of the card 126c through the first inlet 126a, a recess portion 142 may be formed at the peripheral region 141.

Even though a recess portion 142 is provided, it is preferable to not dispose any object, other than the first hooking member 150, near the recess portion 142 if the object could interfere with the card 126c being inserted into or withdrawn from the first inlet 126a. To avoid interference with other objects, the location of the card socket 126 can be moved farther away from the front case 121; however, this would cause the thickness of the mobile terminal to be increased.

It is possible to make the first hooking member 150 not interfere with the card 126c, without disposing the card socket 126 farther from the front case by forming the first hooking member 150 of metal and coupling the first hooking member 150 to the front case 121. Although the first hooking member 150 is formed to be thinner than the second hooking member 145, this does not weaken the strength of the first hooking member 150 for keeping the battery 127b in the accommodating portion 127a. If the front case 121 is also formed of metal like the first hooking member 150, the coupling between the front case 121 and the first hooking member 150 can be strengthened.

Figure 6:
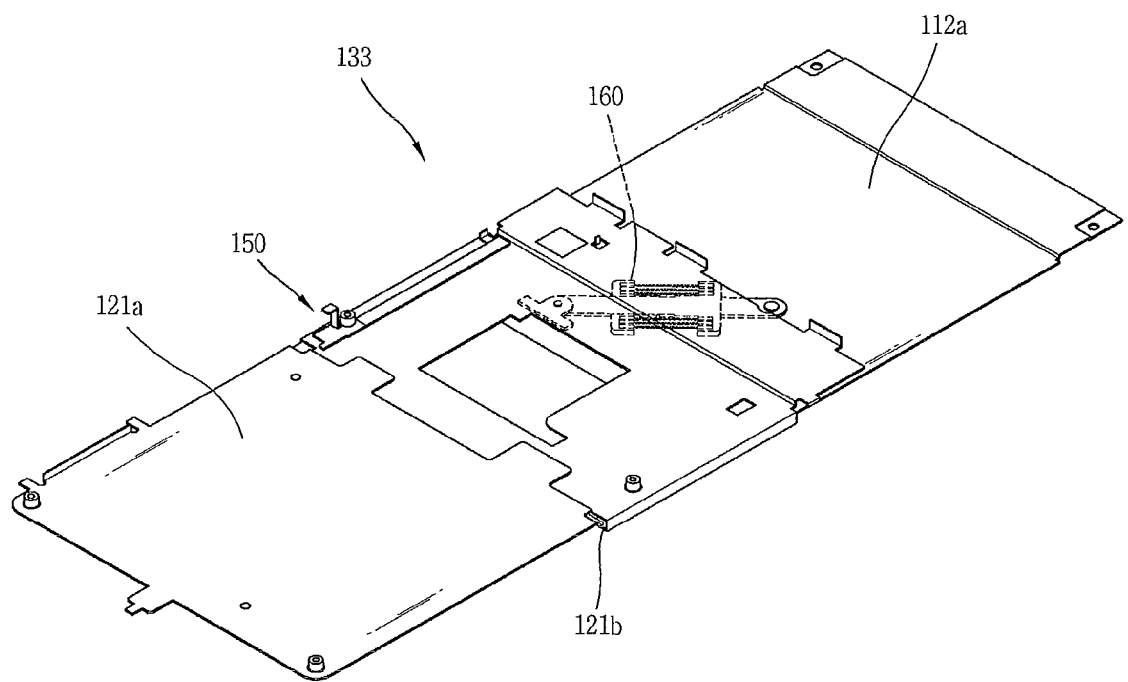
FIG. 6 is a perspective view showing the slide module of the mobile terminal of FIG. 1.

FIG. 6 is a perspective view showing the slide module 133 of FIG. 3. As shown in FIG. 6, the slide module 133, as aforementioned with referring to FIG. 2, slidably couples the first body 110 with the second body 120. The slide module 133 includes a first sliding plate 112a and a second sliding plate 121a, where the first and second sliding plates 112a and 121a are slidably coupled to each other by a guide rail 121b. A spring assist mechanism 160 is provided to help move the first body 110 between the closed configuration and the open configuration.

In this exemplary embodiment, the first sliding plate 112a can be formed integral with the rear case 112 and the second sliding plate 121 can be formed integral with the front case 121. The first sliding plate 112a constitutes an appearance of the first body 110 with the front case 111. At the first sliding plate 112a, electronic components such as a display module may be mounted. The second sliding plate 121a constitutes an appearance of the second body 120 with the rear case 122. Electronic components such as a circuit board may be disposed in a space defined by the second sliding plate 121a and the portion of the rear case 122 near the opening portion.

Figure 7:
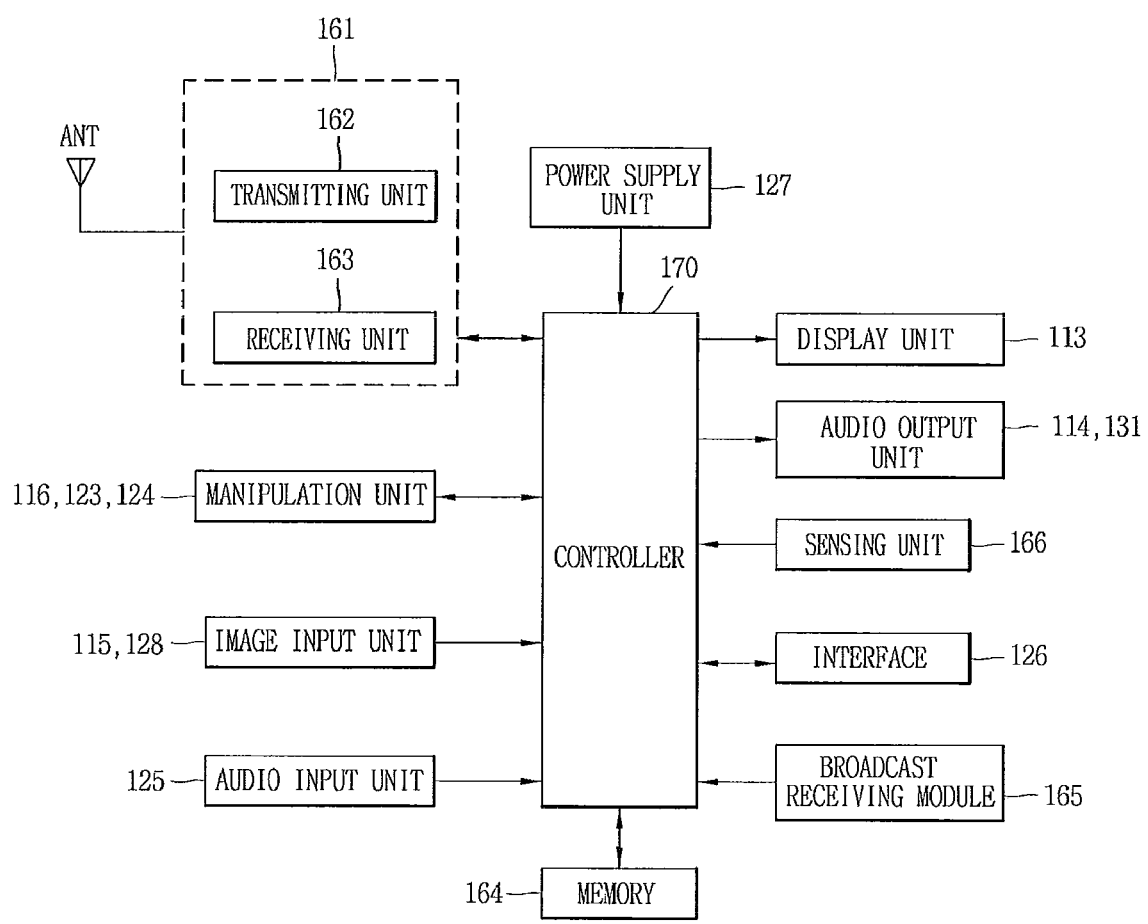
FIG. 7 is a schematic block diagram of the mobile terminal according to the exemplary embodiment of the present invention.

With this configuration, the mobile phone can be slimmer because the rear case 112 and the front case 121 are not provided independently from the slide module 133. In addition, even though the card socket 126 is provided, the first hooking member 150 is coupled to the second sliding plate 121a and is thin enough not to interfere with the card socket 126. This also allows the mobile phone to have a slim configuration FIG. 7 is a schematic block diagram of the mobile terminal according to an exemplary embodiment of the present invention. With reference to FIG. 7, the mobile terminal according to the exemplary embodiment of the present invention includes a wireless communication module 161, manipulating units 116, 123, and 124, the image input units 115 and 128, the audio input unit 125, the display unit 113, the audio output units 114 and 131, a sensing unit 166, the interface 126, a broadcast receiving module 165, a memory 164, the power supply unit 127, and a controller 170. The controller 170 generally controls the general operation of the mobile terminal. For example, the controller 170 performs controlling and processing related to a voice call, data communication, a video call, or the like. In addition, the controller 170 may control other functions, such as those functions related to multimedia capabilities, of the mobile terminal.

The wireless communication module 161 transmits/receives radio signals to/from a mobile communication base station via an antenna. For example, the wireless communication module 161 handles transmission/reception of audio data, text data, video data, and control data under the control of the controller 170. The wireless communication module 161 also includes a transmitting unit 162 that modulates a signal to be transmitted and transmits the modulated signal and a receiving unit 163 that demodulates a received signal.

The manipulating units 116, 123 and 124 may be configured to provide key input data inputted by the user to the controller 170 to control the operation of the terminal. Each of the manipulating units 116, 123 and 124 may be formed as a dome switch, a touch pad (e.g., static pressure/capacitance), a jog wheel, a jog switch, and the like as note above.

The image input units 115 and 128 process an image frame such as a still image or video obtained by an image sensor during a video calling mode or in an image capturing mode. The processed image frame may be converted into image data that can be displayed on the display unit 113 and then outputted to the display unit 113. The image frame processed by the image input units 115 and 128 may be stored in the memory 164 or transmitted via the wireless communication module 161 under the control of the controller 170.

The audio input unit 125 receives by a microphone an external audio signal in a calling mode, recording mode, voice recognition mode, etc., and processes it into electrical voice data. In case of the calling mode, the processed voice data may be converted for output into a format that can be transmittable to the mobile communication base station via the wireless communication module 161. In case of the recording mode, the processed voice data is outputted so as to be stored in the memory 164. The audio input unit 125 may include assorted noise canceling algorithms to cancel noise generated in the course of receiving the external audio signal.

The display unit 113 displays and outputs information processed in the mobile terminal. For example, when the mobile terminal is in a calling mode, the display unit 113 displays a UI or GUI related to a call under the control of the controller 170. When the mobile terminal is in a video calling mode or an image capturing mode, the display unit 113 may display a captured/received image, UI, and/or a GUI under the control of the controller 170. If the display unit 113 includes a touch screen, the display unit 113 may be also used as an input unit as well as the output unit.

The audio output units 114 and 131 output audio data which has been received from the wireless communication module 161 in a call signal reception mode, a calling mode, a recording mode, a voice recognition mode, a broadcast reception mode, or the like, or output audio data which has been stored in the memory 164. In addition, the audio output units 114 and 131 output an audio signal related to a function (e.g., a call signal reception sound, a message reception sound, or the like.) performed by the mobile terminal. The audio output units 114 and 131 may include a speaker, a buzzer, or the like.

The sensing unit 166 senses a current state of the mobile terminal such as an opened or closed configuration of the mobile terminal, a location of the mobile terminal, or whether the mobile terminal is being touched or not by the user, and generates a sense signal for controlling the operation of the mobile terminal. For example, when the mobile terminal is a slide phone, the sensing unit 166 may sense whether the slide phone is opened or closed and output the sensing result to the controller 170 to control the operation of the terminal. In addition, the sensing unit 166 handles a sensing function as to whether or not the power supply unit 127 supplies power or whether or not the interface unit 26 is combined with an external device.

The interface 126 serves to interface with external devices to be connected with the mobile terminal. For example, the external devices may include a wired/wireless headset, an external charger, a wired/wireless data port, a card socket (e.g., for coupling a memory card, a SIM/UIM card), and the like. The interface 126 may receive data from the external device or be provided with power and transfer the received data or power to each element of the mobile terminal. The interface 126 may also transmit internal data of the mobile terminal to an external device.

The memory 164 may store a program for processing and controlling performed by the controller 170, and may also perform a function for temporarily storing inputted or outputted data (e.g., a phone book, a message, a still image, or video, or the like). In addition, the memory 164 may store a program for controlling an operation of the mobile terminal related to the present invention. The memory 164 may include a storage medium of at least one of a hard disk type memory, a card type memory (e.g., an SD or XD memory, or the like.), a flash memory, a RAM, or a ROM.

The broadcast receiving module 165 may receive a broadcast signal transmitted through a satellite or terrestrial waves, convert it into a broadcast data format that can be outputted to the display unit 113, and outputs the same to the controller 170. In addition, the broadcast receiving module 165 receives supplementary data (e.g., Electric Program Guide (EPG), a channel list, or the like) associated with a broadcast. The broadcast data converted in the broadcast receiving module 165 and the supplementary data may be stored in the memory 164.

The power supply unit 127 receives external or internal power and supplies power required for an operation of each element under the control of the controller 170.

As the exemplary embodiment of the mobile terminal may be implemented in several forms without departing from the characteristics thereof, it should also be understood that the above-described embodiments are not limited by any of the details of the foregoing description, unless otherwise specified, but rather should be construed broadly within its scope as defined in the appended claims. For example, while the exemplary embodiment is shown as a sliding type mobile terminal, the claimed invention could be implemented in other types of mobile terminals including, but not limited thereto, bar type mobile terminals and folding type mobile terminals. Therefore, various changes and modifications that fall within the scope of the claims, or equivalents of such scope are therefore intended to be embraced by the appended claims.

What is claimed is:

1. A mobile terminal comprising:
   a first member having an opening extending therethrough;
   a second member coupled to the first member such that the second member defines, with the opening of the first member, an accommodating portion to receive a battery therein;
   a hooking member protrudingly formed at the second member, the hooking member being configured to hook a portion of the battery received in the accommodating portion;
   a card socket disposed in a space defined by the first and second members to receive a card, the card socket being configured to allow the card received in the card socket to be withdrawn toward the battery in the accommodating portion,
   wherein the hooking member extends from the second member toward the first member such that an end of the card is blocked by the hooking member when the card is received in the card socket.

2. The mobile terminal of claim 1, wherein at least one of the second member and the hooking member has a thickness that is thinner than a thickness of the first member.

3. The mobile terminal of claim 2, wherein the first member is formed of a molded plastic, and at least one of the second member and the hooking member is formed of metal.

4. The mobile terminal of claim 1, wherein the hooking member includes:
   a planar shaped base portion mounted to the second member;
   an extending portion extending from an edge of the base portion in a first direction to extend toward the first member; and
   a protruding portion protruded from an end of the extending portion in a second direction that is different than the first direction.

5. The mobile terminal of claim 1, wherein the first member and the second member are coupled to form one body, and the second member is slidably coupled to another body.

6. A mobile terminal comprising:
   a first body, the first body including a first sliding plate;
   a second body slidably connected to the first body, the second body including a rear case and a second sliding plate slidably coupled with the first sliding plate, and the second body having an accommodating portion configured to receive a battery therein;
   a first hooking member protrudingly formed at the second sliding plate, the first hooking member being configured to hook a portion of the battery received in the accommodating portion; and
   a card socket disposed between the second sliding plate and the rear case,
   wherein a recess is formed in a peripheral portion configured to surround an edge portion of the accommodating portion of the rear case, the recess located adjacent to the first hooking portion such that a card is insertable through the recess into the card socket.

7. The mobile terminal of claim 6, wherein at least one of the first sliding plate, the second sliding plate, and the first hooking member has a thickness that is thinner than a thickness of the rear case.

8. The mobile terminal of claim 6, further comprising:
   a second hooking member protruded from the rear case toward the accommodating portion, the second hooking member being configured to hook another portion of the battery received in the accommodating portion, and the second hooking member being integrally formed with the rear case.

9. The mobile terminal of claim 6, wherein the peripheral region is configured to support a cover covering the battery such that the cover is flush with a neighboring portion of the rear case.

10. The mobile terminal of claim 6, wherein the first hooking member extends from the second sliding plate toward the rear case such that an end of the card is blocked by the first hooking member when the card is received in the card socket.

11. The mobile terminal of claim 6, wherein the first sliding plate is formed integral with the first body and the second sliding plate is formed integral with the second body.

12. The mobile terminal of claim 10, wherein the first hooking member includes:
   a planar shaped base portion mounted to the second sliding plate;
   an extending portion extending from an edge of the base portion in a first direction to extend toward the rear case; and
   a protruding portion protruded from an end of the extending portion in a second direction that is different than the first direction.

13. The mobile terminal of claim 11, wherein the first sliding plate defines a surface of the first body.

14. A mobile terminal comprising:
   a body having an accommodating portion configured to receive a battery therein, the body including a plate forming a floor of the accommodating portion, and a casing forming a side wall of the accommodating portion;
   a first hooking member protrudingly formed at the plate;
   a second hooking member protrudingly formed at the casing, the first and second hooking members being configured to hook different portions of the battery; and
   a card socket formed at the casing for receiving a card therein,
   wherein the first hooking member extends from the plate toward the casing such that an end of the card is blocked by the first hooking member when the card is received in the card socket.

15. The mobile terminal of claim 14, wherein the card socket is located to allow the card to be withdrawn in a direction toward the first hooking member.

16. The mobile terminal of claim 15, wherein the first hooking member is formed to be elastically deformable.

* * * * *